3,088,961
π-CYCLOPENTADIENYL COBALT CYCLOPENTADIENE COMPOUNDS

Geoffrey Wilkinson, London, England, assignor to Ethyl Corporation, New York, N.Y., a corporation of Virginia
No Drawing. Filed June 29, 1960, Ser. No. 39,438
Claims priority, application Great Britain July 31, 1959
10 Claims. (Cl. 260—439)

This invention relates to new organometallic compounds and methods for their preparation. More specifically, my invention relates to compounds of cobalt in which a cyclomatic moiety and a cyclopentadiene molecular moiety are both bonded to the cobalt atom. A further aspect of my invention relates to processes for preparing these compounds.

It is an object of this invention to provide novel organometallic compounds and methods for their preparation. A further object is to provide novel cyclomatic cobalt cyclopentadiene compounds and methods for their preparation. Additional objects will become apparent by a reading of the specification and claims which follow.

My invention involves new compounds having the formula:

$$\pi\text{-CyCoCyX}$$

In this formula, π-Cy represents a cyclomatic moiety, which may be substituted with univalent groups and which is sandwich bonded to the cobalt atom. By cyclomatic moiety, I mean a cyclopentadienyl radical, substituted or unsubstituted, as described below. The group CyX is a cyclopentadiene molecular moiety in which X can be hydrogen, deuterium, a lower alkyl or lower aryl group containing from one to about 10 carbon atoms such as methyl, ethyl, propyl, butyl, decyl, phenyl, tolyl and the like, or a mono- or di-substituted alkyl or aryl group such as dichloromethyl, monochloromethyl, dibromopropyl, difluoroamyl, monobromobutyl, monochlorophenyl and the like. Further substituent groups which can be present in X are —SR, SeR, —PR$_2$, —TeR, —AsR$_2$, —SiR$_2$, —GeR$_3$, —SnR$_3$, or —PbR$_3$ in which R is a lower alkyl or aryl group.

The cyclomatic group, Cy, as stated above may be substituted and preferably contains from five to 13 carbon atoms. In general, it can be represented by the formulae

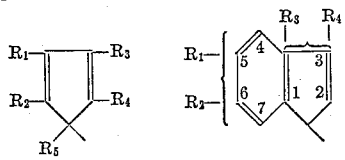

where the R's are preferably selected from the group consisting of hydrogen and univalent organic hydrocarbon radicals. Typical of such cyclomatic hydrocarbon groups are cyclopentadienyl, indenyl, methylcyclopentadienyl, propylcyclopentadienyl, diethylcyclopentadienyl, phenylcyclopentadienyl, tert - butylcyclopentadienyl, p-ethyl phenylcyclopentadienyl, 4-tert-butylindenyl and the like. The compounds which yield these radicals are preferred as they are the more readily available cyclomatic compounds.

The cyclopentadiene moiety represented above as CyX is, in contradistinction to the cyclomatic or cyclopentadienyl moiety represented by Cy, a neutral molecule. Thus, it differs from the Cy moiety in that the open bond shown in the above formulae is occupied by X as defined above.

The bonding of the cyclopentadienyl moiety, Cy, and the cyclopentadiene molecule, CyX, to the cobalt atom results in compounds having a unique structure in which nine electrons are donated to the cobalt atom for bonding. Five electrons are contributed from the cyclomatic group, Cy, and four electrons are contributed from the cyclopentadiene molecule, CyX. The contribution of nine electrons to the cobalt atom gives it the electronic configuration of the rare gas krypton. This contributes to the stability of the compounds.

The compounds of my invention may be prepared by several processes. The first process involves reacting a bis(cyclomatic) cobalt cation with a reducing agent such as sodium borohydride or lithium aluminum hydride in the presence of a neutral solvent. This reaction may be carried out between about —20° C. to about 100° C. at pressures from about 10$^{-2}$ cm. to about 100 atmospheres. The reaction may be carried out in the presence of an inert blanketing gas, and the solution may be agitated to increase the reaction rate.

In this reaction, a neutral solvent may be employed such as an aliphatic hydrocarbon, e.g., hexane, heptane or octane, or a polar ether solvent such as tetrahydrofuran, ethyleneglycol dimethylether, diethyleneglycol dimethylether, dioxane, diethyleneglycol dibutylether, diethyleneglycol diethylether, ethyleneglycol dibutylether and the like. Preferred solvents are the polar ethers as illustrated above. A variation in the above reaction is afforded by reduction of the cobalticinium ion with other reductants such as lithium aluminum deuteride which results in formation of cyclopentadienyl cobalt deuterocyclopentadiene.

A different route for preparing my novel compounds involves reaction between dicyclopentadienyl cobalt and organic halides to produce cyclopentadienyl cobalt 1-organocyclopentadiene. Typical organic halides are the alkyl halides, e.g., methyl iodide, ethyl bromide and butyl iodide; aryl halides, e.g., phenyl iodide, ethylphenyl bromide and the like. Typical compounds resulting from use of these organo halides are respectively cyclopentadienyl cobalt 1-endomethylcyclopentadiene, cyclopentadienyl cobalt 1-endoethylcyclopentadiene, cyclopentadienyl cobalt 1-endophenylcyclopentadiene and cyclopentadienyl cobalt 1-endobutylcyclopentadiene. This reaction may be carried out between temperatures from about 20° C. to about 150° C. and pressures from about 10$^{-2}$ cm. to about 200 atmospheres. A neutral organic solvent may be used in this reaction such as the ethers, aliphatic, hydrocarbons, etc., enumerated above. The reaction may be carried out under a blanketing atmosphere of an inert gas such as nitrogen, argon, krypton and neon. Agitation of the reaction mixture may be employed although this is not essential. The prefix "1-endo" employed in the above compound signifies that the substituent on the 1-carbon atom of the cyclopentadiene ring is on the metal side of the ring. According to present knowledge, the cyclopentadienyl radical and the cyclopentadiene molecule in the compounds of this invention lie in substantially parallel planes above and below the metal atom and that the bonds between the 1-carbon atom of the cyclopentadiene ring to the two exocyclic substituents thereon (the hydrogen radical and the group designated as X above) are angularly disposed to the ring outside of the ring plane. Thus viewed from the side, the compound cyclopentadienyl cobalt 1-endoethylcyclopentadiene has the configuration given below.

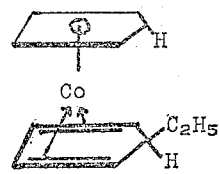

A still further method for preparing the novel compounds of my invention involves reduction of certain perhalo compounds such as cyclopentadienyl cobalt 1-endotrichloromethylcyclopentadiene, cyclopentadienyl cobalt 1-endotribromomethylcyclopentadiene and cyclopentadienyl cobalt 1-endotriiodomethylcyclopentadiene. These starting materials may be prepared by the reaction of cobaltocene with carbon tetrachloride, carbon tetrabromide or carbon tetraiodide. On reduction of these compounds with lithium aluminum hydride or other typical reductants such as sodium borohydride, there are obtained compounds such as cyclopentadienyl cobalt 1-endodichloromethylcyclopentadiene, cyclopentadienyl cobalt 1-endomonobromomethylcyclopentadiene, cyclopentadienyl cobalt 1-endomonochloromethylcyclopentadiene and cyclopentadienyl cobalt 1-endodiiodomethylcyclopentadiene. This reaction may be carried out between temperatures from about $-20°$ C. to about $100°$ C. and pressures ranging from about $10^{-2}$ cm. to about 100 atmospheres. The reaction may be carried out in the presence of an inert gas such as nitrogen, argon, krypton and neon. Agitation may be employed although its use is not essential to the success of the reaction.

To further illustrate my novel methods and compounds, there are presented the following examples. In these examples, all parts and percentages are by weight unless otherwise indicated.

*Example I*

Five parts of cobalticinium tribromide in 130 parts of ethyleneglycol dimethylether was treated with five parts of sodium borohydride which was added in small portions with rapid stirring. A vigorous evolution of hydrogen occurred, and a green coating formed on the sodium borohydride indicating the formation of cobalticinium borohydride. Either on warming to $60°$ C. or on addition of two parts of water, the mixture turned a deep wine-red color. After one hour the solution was filtered, and the residue was washed with ether. The filtrate was reduced in volume by heating in vacuum and was then extracted with light petroleum. This solution was concentrated, and the product was separated in an alumina column. The first red band eluted by petroleum was evaporated, and the residue was sublimed in vacuum onto a probe at $-70°$ C. to give the product, cyclopentadienyl cobalt cyclopentadiene. An 80 per cent yield was obtained. On analysis, there was found: C, 63.0 and H, 6.2 per cent. The molecular weight of the compound was found to be 193 as determined by an ebullioscopic method in which the compound was dissolved in benzene. Calculated values were C, 63.17 and H, 5.83 percent with a molecular weight of 190. The compound is air sensitive and decomposes on exposure to air. The compound reacts with N-bromosuccinimide in benzene to give cobalticinium bromide quantitatively. Reaction with benzaldehyde in an alkaline solution gave the cobalticinium ion together with benzyl alcohol and benzoic acid.

*Example II*

To a solution containing 0.2 part of lithium aluminum deuteride was added solid anhydrous cobalticinium chloride in small portions until no further effervescence occurred. The product, cyclopentadienyl cobalt deuterocyclopentadiene, was isolated in the same manner as in Example I. The yield of product was 80 percent based on the quantity of lithium aluminum deuteride employed.

The anhydrous cobalticinium chloride used in the reaction was obtained by evaporating hydrochloric acid solutions of the cation on a steam bath to give a dark green oily mass. This was triturated with tetrahydrofuran and the residual crystals were dissolved in and crystallized from tetrahydrofuran. It forms large pale green crystals and is an etherate.

The cobalt compound, cyclopentadienyl cobalt cyclopentadiene, obtained in Example I was allowed to stand in tetrahydrofuran solution at $25°$ C. with an excess of lithium aluminum deuteride. After three hours, the solvent was removed, and the compound was extracted and purified. The infrared spectrum was identical to that of the starting material showing that the cyclopentadienyl cobalt cyclopentadiene compound was recovered unchanged.

*Example III*

Bis(methylcyclopentadiene) cobalticinium tribromide was reacted with lithium aluminum hydride in the same manner as described in Example I. The reaction product was concentrated, etc., in the same manner as in Example I and passed through a chromatographic column. On evaporation of the eluate from the column, a deep red oil was obtained. Using an 80 centimeter alumina column, further treatment gave only a single elution band. The oil, methylcyclopentadienyl cobalt methylcylopentadiene, melted sharply at $-5°$ C. and was purified by vacuum distillation. Found: C, 65.1 and H, 6.8 percent. Required: C, 66.04 and H. 6.9 per cent.

*Example IV*

Three parts of cobaltocene and 11.4 parts of methyl iodide were heated in a sealed tube for two hours at $80°$ C. The excess methyl iodide was removed, and the residue was extracted with a mixture of 40–60° petroleum (70 percent) and anhydrous diethylether. The product was chromatographed twice using the petroleum-ether mixture as eluent. It was then distilled at $10^{-3}$ mm. and $40°$ C. onto an ice-cooled probe to give a red oil which is cyclopentadienyl cobalt 1-endomethylcyclopentadiene. The yield of cyclopentadienyl cobalt 1-endomethylcyclopentadiene was 30 percent based on the amount of cobaltocene employed. On analysis, there was found: C, 64.7 and H, 6.4 per cent with a molecular weight of 204 (ebullioscopic in benzene). $C_{11}H_{13}Co$ requires C, 64.83 and H, 6.66 percent with a molecular weight of 204.6. The compound is readily soluble in all organic solvents, but its solutions and the pure compound decompose in air.

*Example V*

Five-tenths part of cyclopentadienyl cobalt 1-endotrichloromethylcyclopentadiene in tetrahydrofuran was treated with one part of lithium aluminum hydride. After one-half hour, a large excess of water was carefully added to the mixture, and the solution was extracted with light petroleum. The orange-colored petrol layer was separated and washed thoroughly with water. It was then dried with calcium chloride and evaporated to a small volume which was chromatographed in an ether-petroleum mixture on a 3-foot alumina column. The eluate was evaporated and the product, cyclopentadienyl cobalt 1-endodichloromethylcyclopentadiene, was crystallized at low temperatures from isopentane. The yield was 75 percent. Found: C, 48.6; H, 4.31 and Cl, 25.1 per cent with a molecular weight (ebullioscopic in benzene) of 278.7. $C_{11}H_{11}Cl_2Co$ requires: C, 48.4; H, 4.06 and Cl, 26.0 per cent with a molecular weight of 273.

The compounds of my invention find utility as gasoline additives. Their function in the gasoline is to enhance its antiknock properties particularly by enhancing the antiknock activity of other antiknock compounds, e.g. tetraethyllead, co-present in the gasoline. When employed as additives to gasoline, there may also be present alkylene halide scavengers such as ethylenedichloride and ethylenedibromide.

The compounds of my invention can be used in forming metallic mirrors comprising a layer or coating of cobalt on a substrate material. These mirrors are formed by thermally decomposing one of the compounds of my invention at a temperature above $400°$ C. On the decomposition of the compound, cobalt deposits on adjacent surfaces to form thereon a metallic mirror. These mirrors have the useful and desirable property of protecting the base material against corrosion. Also, they can be used to decorate the base material as by applying the mirror to a base material that is covered by a stencil. The compounds of the present invention can be deposited on glass, glass cloth, resins and other insulating supports.

It is preferred that inert gases, e.g. argon, be used to protect the base material from oxidation during the mirror-forming operation.

Deposition on glass cloth illustrates one form of the applied processes. A glass cloth band weighing one gram is dried from one hour in an oven at 150° C. Then together with 0.5 gram of cyclopentadienyl cobalt cyclopentadiene, it is enclosed in a glass tube devoid of air and heated at 400° C. for one hour, after which time the tube is cooled and opened. The cloth has a uniform metallic appearance and exhibits a gain in weight of about 0.02 gram. The cloth has decreased resistivity and each fiber is a conductor. Application of current to the cloth causes an increase in its temperature. Thus, a conducting cloth has been prepared. The cloth can be used to reduce static electricity, for decoration, for thermal insulation by reflection, and as a heating element.

The compounds of my invention have further utility as additives to residual and distillate fuels generally, e.g., jet fuels, home heater fuels and diesel fuels, to reduce smoke and/or soot. Further, my compounds may be incorporated in paints, varnish, printing inks, synthetic resins of the drying oil type, oil enamels and the like to impart improved drying characteristics to such compositions. Another important utility of my compounds is their use as chemical intermediates in the preparation of metal-containing polymeric materials.

My new compounds are quite different from compounds in which two cyclopentadienyl radicals are coordinated or sandwich bonded to the cobalt atom. For example, they are diamagnetic, showing that no unpaired electrons are present, whereas dicyclopentadienyl cobalt, of course, has an unpaired electron. Presence of a cyclic $C_5H_6$ (cyclopentadiene) unit in my compounds is also demonstrated by their chemical properties. For example, their reaction with N-bromosuccinimide in benzene quantitatively gives the corresponding cobalticinium bromide. Infrared spectra and nuclear magnetic resonance measurements also confirm the presence of the $C_5H_6$ moiety or derivatives thereof as the case may be.

Having fully defined the novel compounds of my invention, their novel mode of preparation and their manifold utilities, I desire to be limited only within the lawful scope of the appended claims.

I claim:
1. Organometallic compounds having the formula $\pi$-CyCoCyX in which $\pi$-Cy is a cyclomatic radical selected from the class consisting of the cyclopentadienyl radical and hydrocarbon substituted cyclopentadienyl radicals having 6 to 13 carbon atoms and embodying the general ring configuration found in cyclopentadiene, and CyX is a cyclopentadiene molecule in which X is selected from the group consisting of hydrogen, deuterium, and lower alkyl and lower aryl groups.

2. Process comprising reacting a bis(cyclomatic)cobalt unipositive cation, in which the cyclomatic radicals are selected from the class consisting of the cyclopentadienyl radical and hydrocarbon substituted cyclopentadienyl radicals having 6 to 13 carbon atoms and embodying the general ring configuration found in cyclopentadiene, with a complex hydride.

3. Process for preparing cyclopentadienyl cobalt cyclopentadiene, which comprises reacting cobalticinium tribromide with sodium borohydride.

4. Process comprising reacting a bis(cyclopentadienyl) cobalt compound in which the cyclopentadienyl radical is selected from the class consisting of the cyclopentadienyl radical and hydrocarbon substituted cyclopentadienyl radicals having 6 to 13 carbon atoms and embodying the general ring configuration found in cyclopentadiene, with an organic halide selected from the class consisting of lower alkyl halides and lower aryl halides, and separating from the reaction mixture a compound $\pi$-CyCoCyX in which $\pi$-Cy is a cyclomatic radical selected from the class consisting of the cyclopentadienyl radical and hydrocarbon substituted cyclopentadienyl radicals having 6 to 13 carbon atoms and embodying the general ring configuration found in cyclopentadiene, and CyX is a cyclopentadiene molecule in which X is selected from the group consisting of lower alkyl and lower aryl groups, said process being carried out in an inert atmosphere.

5. Process comprising reacting a cyclopentadienyl cobalt 1-endotrihalomethylcyclopentadiene compound selected from the class consisting of cyclopentadienyl cobalt 1-endotrichloromethylcyclopentadiene, cyclopentadienyl cobalt 1-endobromomethylcyclopentadiene, and cyclopentadienyl cobalt 1-endotriiodomethyl cyclopentadiene, with a complex hydride.

6. Cyclopentadienyl cobalt cyclopentadiene.
7. Cyclopentadienyl cobalt deuterocyclopentadiene.
8. Methylcyclopentadienyl cobalt methylcyclopentadiene.
9. Cyclopentadienyl cobalt 1-endomethylcyclopentadiene.
10. Cyclopentadienyl cobalt 1-endodichloromethylcyclopentadiene.

References Cited in the file of this patent

Wilkinson: J. Inorganic and Nuclear Chem., vol. 2, page 103 and others (1955).

Katz et al.: J.A.C.S., page 6495, vol. 80, No. 23 (December 1958).

Progress in Inorganic Chemistry, edited by F. A. Cotton, pages 44, 45 and 49 (1959).

Coates: Organo-Metallic Compounds, 2nd ed., 1960, pages 302–303.